(12) United States Patent
Kamei (10) Patent No.: US 11,613,901 B2
(45) Date of Patent: Mar. 28, 2023

(54) FLOOD-RESISTANT BUILDING EQUIPPED WITH FLOOD BARRIER, AND RENOVATION METHOD

(71) Applicant: Masamichi Kamei, Tokyo (JP)

(72) Inventor: Masamichi Kamei, Tokyo (JP)

(73) Assignee: LAND BUSINESS CO., LTD., Tokyo (JP)

( * ) Notice: Subject to any disclaimer, the term of this patent is extended or adjusted under 35 U.S.C. 154(b) by 0 days.

(21) Appl. No.: 17/277,547

(22) PCT Filed: Oct. 8, 2019

(86) PCT No.: PCT/JP2019/039617
§ 371 (c)(1),
(2) Date: Mar. 18, 2021

(87) PCT Pub. No.: WO2020/085080
PCT Pub. Date: Apr. 30, 2020

(65) Prior Publication Data
US 2021/0363772 A1    Nov. 25, 2021

(30) Foreign Application Priority Data

Oct. 22, 2018   (JP) .............................. JP2018-195613

(51) Int. Cl.
*E04H 9/14*    (2006.01)
*E02B 3/10*    (2006.01)
(Continued)

(52) U.S. Cl.
CPC ............... *E04H 9/145* (2013.01); *E02B 3/10* (2013.01); *E06B 9/04* (2013.01); *E03B 11/02* (2013.01); *E03F 5/10* (2013.01); *E06B 2009/007* (2013.01)

(58) Field of Classification Search
CPC ... E04H 9/14; E04H 9/145; E02B 3/10; E02B 3/102; E02B 3/104; E06B 9/00; E06B 2009/007; Y02A 10/30; Y02A 50/00
See application file for complete search history.

(56) References Cited

U.S. PATENT DOCUMENTS 4,599,166 A * 7/1986 Gesslauer ............... C02F 9/005
210/96.1
5,460,462 A * 10/1995 Regan ..................... E02B 3/104
405/96
(Continued)

FOREIGN PATENT DOCUMENTS

BR    112021004089 A2    5/2021
CN       107326861 A    11/2017
(Continued)

OTHER PUBLICATIONS

International Search Report issued in Patent Application No. PCT/JP2019/039617 dated Dec. 24, 2019.
(Continued)

*Primary Examiner* — William V Gilbert
(74) *Attorney, Agent, or Firm* — Pearne & Gordon LLP (57) ABSTRACT

A flood-resistant building is equipped with a flood barrier which enables safe and long-term refuge during floods. In a site surrounding a building, a flood barrier is constructed which encloses nearly the entire periphery of the building. An opening sealing means is connected to an entrance hall and another section serving as an entrance and exit at normal times. The opening sealing means seals the openings of these sections in a watertight manner where the openings are sealed via the opening sealing means. The flood barrier is watertight and at least as tall as the inundation depth estimated to occur in a target area when flooding or storm surges arise. In order to enable long-term refuge, an emergency-use water receiving tank 4 and an emergency-use
(Continued)

generator are installed on the roof of the building, and an emergency-use septic tank is installed underground on the site.

8 Claims, 6 Drawing Sheets

(51) Int. Cl.
*E06B 9/04* (2006.01)
*E03B 11/02* (2006.01)
*E03F 5/10* (2006.01)
*E06B 9/00* (2006.01)

(56) References Cited

U.S. PATENT DOCUMENTS

| | | | | |
|---|---|---|---|---|
| 6,332,229 | B1* | 12/2001 | O'Malley | E03D 5/08 4/441 |
| 6,338,594 | B1* | 1/2002 | Adler | E02B 3/104 405/97 |
| 6,623,209 | B1* | 9/2003 | Waters, Jr. | E06B 9/04 405/94 |
| 7,832,466 | B2* | 11/2010 | Al-Hashash | F24D 17/02 62/118 |
| 8,591,171 | B1* | 11/2013 | Maynard | F03D 3/0409 415/4.4 |
| 9,670,633 | B1 | 6/2017 | Thieding | |
| 10,975,538 | B2* | 4/2021 | Adler | E03F 9/007 |
| 2002/0083651 | A1* | 7/2002 | Nomura | E04H 9/10 52/1 |
| 2004/0129625 | A1* | 7/2004 | Wang | E03D 11/00 210/182 |
| 2007/0018462 | A1* | 1/2007 | Richards | F03D 9/25 290/55 |
| 2007/0283866 | A1* | 12/2007 | Veazey | B63B 5/18 114/77 R |
| 2008/0041794 | A1* | 2/2008 | Shah | B01J 31/08 210/759 |
| 2008/0110505 | A1* | 5/2008 | Coronado | E03B 11/06 137/357 |
| 2010/0043298 | A1* | 2/2010 | Anhamm | A62C 2/06 49/383 |
| 2010/0072757 | A1* | 3/2010 | Kealy | F02B 37/001 290/1 A |
| 2010/0107564 | A1* | 5/2010 | Macler, Jr | B65D 75/54 53/410 |
| 2011/0315613 | A1* | 12/2011 | Al-Ghamdi | F24D 17/0021 210/104 |
| 2013/0119661 | A1* | 5/2013 | Pringle | F03D 9/34 290/55 |
| 2015/0194558 | A1* | 7/2015 | Wang | H01L 31/0525 320/101 |
| 2015/0286200 | A1* | 10/2015 | Eger | H02J 7/0013 700/295 |
| 2016/0010298 | A1* | 1/2016 | Waters, Jr. | E02B 3/102 405/96 |
| 2016/0201281 | A1* | 7/2016 | Roy | E02B 3/102 405/107 |
| 2016/0230362 | A1* | 8/2016 | Frosdick | E02B 3/106 |
| 2016/0273181 | A1* | 9/2016 | Smith | E02B 3/041 |
| 2021/0363772 | A1 | 11/2021 | Kamei | |

FOREIGN PATENT DOCUMENTS

| | | |
|---|---|---|
| CN | 109056643 A | 12/2018 |
| CN | 112867835 A | 5/2021 |
| DE | 9004646 U1 | 6/1990 |
| EP | 0 802 285 A2 | 10/1997 |
| EP | 3 842 606 A | 6/2021 |
| FR | 2 950 095 A1 | 3/2011 |
| GB | 2269618 A | 2/1994 |
| GB | 2472245 A | 2/2011 |
| JP | H08-86119 A | 4/1996 |
| JP | H09-268803 A | 10/1997 |
| JP | 2002-242481 A | 8/2002 |
| JP | 2004-293078 A | 10/2004 |
| JP | 3113333 U | 9/2005 |
| JP | 2006-124910 A | 5/2006 |
| JP | 4435512 B2 | 3/2010 |
| JP | 2010-265744 A | 11/2010 |
| JP | 2012-219452 A | 11/2012 |
| JP | 2012-225072 A | 11/2012 |
| JP | 2012-246714 A | 12/2012 |
| JP | 2013-092028 A | 5/2013 |
| JP | 2015-151749 A | 8/2015 |
| JP | 2016-138372 A | 8/2016 |
| JP | 2017-150296 A | 8/2017 |
| JP | 2018-096114 A | 6/2018 |
| JP | 2020-066862 A | 4/2020 |
| KR | 10-2006-0029944 A | 7/2006 |
| PH | 12021550412 A1 | 9/2021 |
| WO | 2018/131391 A1 | 7/2018 |
| WO | 2020/085080 A1 | 4/2020 |

OTHER PUBLICATIONS

Chinese Office Action dated Dec. 8, 2021 for corresponding Chinese Application No. 201980068873.7 and English translation.
Extended European Search Report issued in corresponding application, EP 19 87 5230; dated May 13, 2022.

* cited by examiner

FLOOD-RESISTANT BUILDING EQUIPPED WITH FLOOD BARRIER, AND RENOVATION METHOD

TECHNICAL FIELD

This invention relates to a flood-resistant building equipped with a flood barrier which enables long-term refuge inside a building during floods due to flooding or storm surges, while protecting the building and its residents from the floods, and also to a renovation method of the building. It is to be noted that buildings to which the present invention is to be applied as targets mainly include multiple dwelling housings, hotels, office buildings, hospitals and factories.

BACKGROUND ARTS

It is known that owing to the unusual weather in recent years, floods due to flooding or storm surges are of far more frequent occurrence than estimated. In reference to countermeasures against such floods due to flooding or storm surges, there exist some conventional arts disclosed in the following patent documents 1 to 5, for instance, as one technology for preventing inundation into a building and the like.

The patent document 1 discloses a cutoff device which comprises a cutoff plate with a predetermined area, a box body in which the cutoff plate is stored or mounted, a lower locking member and an upper locking member, wherein the cutoff plate is such that when installed underground in a state of being stored in the box body, a cutoff plate surface is made to be nearly flush with a ground surface, and that entering of flood water such as rain water, river water and seawater is prevented in a manner that the cutoff plate is locked with the upper and lower locking members after being manually erected upwards.

The patent document 2 discloses an emergency-use waterproof retaining wall which is such that a bed plate and a cover plate for protecting a U-shaped groove in the bed plate are placed in a state of being embedded underground at normal times without hindrance to entrance to or exit from a structure such as a building, and that when flooding arises, inundation into the inside of the retaining wall is prevented in a manner that after assembling an individual waterproof retaining wall unit by taking steps of inserting a sheathing board into the U-shaped groove after removal of the cover plate and then connecting and fixing the thus inserted sheathing board to the bed plate through a reinforcing material, the thus assembled waterproof retaining wall unit is connected to each other, followed by sealing a clearance between the units with a joint plate, thereby building the retaining wall so as to be stretched around the structure in such a fashion as to build a wall therearound.

The patent document 3 discloses, as one inundation preventing device which can be speedily assembled on a passageway such as an entrance to a building at emergency situations caused by heavy rains or flooding and also can perform a function of preventing inundation into the building, an inundation preventing device which is to prevent inundation into the building and comprises support materials arranged on the wall faces of both sides of the building passageway, a cutoff panel for blocking the building passageway by joining the opposite ends of the cutoff panel by pressure to these support materials over the whole panel length, a panel receiving beam member arranged on a passageway floor surface between the support material lower ends to receive the lower end of the cutoff panel, a first pressure joining means for joining the lower end of the cutoff panel by pressure onto the panel receiving beam member and a second pressure joining means for joining the panel receiving beam member by pressure onto the passageway floor surface.

The patent document 4 discloses a waterproof shutter which is made to be watertight, wherein the waterproof shutter is arranged at a place such as an entrance to a building to prevent inundation into the building from its outer area at emergency situations.

The patent document 5 discloses, as one cutoff plate for preventing entering of water into a building, a work piece or the like, a cutoff structure which is configured such that both left and right ends of a cutoff panel are fitted to a fixing frame through a gasket. This patent document 5 also describes that inundation into the building through fittings is prevented in a manner that a cutoff plate is installed inside or outside of the fittings, and damages caused by inundation can be also prevented in a manner that the cutoff plate is installed in an inundation preventing wall gate.

PRIOR ART DOCUMENTS

Patent Documents

[Patent document 1] Japanese Patent Publication No. 4435512
[Patent document 2] Japanese Utility Model Registration Publication No. 3113333
[Patent document 3] Japanese Unexamined Patent Application Publication No. 2018-096114
[Patent document 4] Japanese Unexamined Patent Application Publication No. 2016-138372
[Patent document 5] Japanese Unexamined Patent Application Publication No. 2002-242481

SUMMARY OF THE INVENTION

Problems to be Solved by the Invention

The invention disclosed in the patent document 1 is such that entering of the flood water is prevented in a manner that the cutoff plate of the cutoff device installed inconspicuously underground at normal times is locked after being manually erected upward at emergency situations, in which case, however, there exists the need of a wide area for embedment of the cutoff device so as to enclose the entire periphery of the building, and on the other hand, height and area restrictions are imposed on the cutoff plate which is to be manually erected upward, thereby resulting in such disadvantage that the cutoff plate cannot exert its function at all depending on locational conditions of the building against such flooding or storm surges as reaching an estimated inundation depth.

The invention disclosed in the patent document 2 is also such that, similarly to the invention disclosed in the patent document 1, the constituent members of the emergency-use waterproof retaining wall are placed in the state of being embedded underground at normal times, and that when flooding arises, the individual waterproof retaining wall unit is assembled to build the retaining wall so as to be stretched around the structure in such a fashion as to build the wall therearound, and accordingly, there is a problem relating to a space for usual storage of the wall constituent members and/or another problem relating to height and area restrictions. Besides, there exists the need of time and labor for building the retaining wall so as to be stretched around the entire periphery of the structure at emergency situations, thereby resulting in difficulties in application of this retaining wall to a building having a large plane cross section.

The invention disclosed in the patent document 3 is such that inundation into the building is prevented in a manner that the passageway such as the entrance to the building is blocked at emergency situations caused by heavy rains or flooding, in which case, however, in some areas where an inundation depth is estimated to be large, there is a risk of inundation caused by entering of water into the building through its windows, air conditioning ducts or other opening sections and/or that caused by backflows in a sewage pipe. Besides, there is also such a problem that when the duration of inundation is long, the residents would be inhibited from going into or out of the building during inundation.

The invention disclosed in the patent document 4 is such that the waterproof shutter for preventing inundation into the building from its outer area at emergency situations is arranged at the place such as the entrance to the building, in which case, however, the problems similar to those of the invention disclosed in the patent document 3 are involved.

The invention disclosed in the patent document 5 is such that inundation into the building through a cutoff plate position is prevented in a manner that the gasket is interposed in the fixing frame of the cutoff plate, in which case, however, such measures as mounting the gasket to the fixing frame is considered to be one commonly used art per se. Besides, while the patent document 5 additionally describes that the cutoff plate can be also installed in a wall gate position other than a position of the fittings in some cases, it contains no more specific description relating to any configuration for preventing entering of water.

The present invention is achieved for settlement of the above problems in the prior arts, and an object of the present invention is to provide a flood-resistant building equipped with a flood barrier with which the inside of the flood barrier can be kept in a tranquil state so that impact to the building can be also kept to a minimum, and which enables safe and long-term refuge even during floods in a manner that the periphery of the building is enclosed with a permanent flood barrier made to be watertight, together with an opening sealing means for sealing openings of the flood barrier in a watertight manner at emergency situations, even when an outer area of the flood barrier is inundated up to a water level as equal as or close to an estimated inundation depth such that it becomes hard for the residents to go into or out of the building.

Means for Solving the Problems

A flood-resistant building equipped with a flood barrier according to the present invention is characterized in that in the periphery of a building such as a multiple dwelling housing, a hotel, an office building, a hospital and a factory, a flood barrier made to be watertight is constructed in a spacing relationship to the building and in a shape which encloses nearly the entire periphery of the building except openings serving as an entrance and exit at normal times, the flood barrier being made to be at least as tall as an inundation depth estimated to occur in an applicable target area, as well as to have durability capable of resisting the water pressure at least corresponding to the estimated inundation depth, and an opening sealing means for sealing the openings of the flood barrier in a watertight manner during inundation is provided in the flood barrier openings.

Under the circumstances that damages due to storm surges by recent typhoons and the like have become a problem, it is said that in Koto, Katsushika, Edogawa, Adachi and Sumida wards in Tokyo, Japan, for instance, there are several areas where inundation up to 3 to 5 m is estimated to occur, and in these areas, there might be a fear of taking ten days to about two weeks before the supply of electricity, gas and water-and-sewage services is fully restored.

In this case, horizontal refuge which is one behavior of refuge in advance to a place out of the area which is expected to be inundated has been heretofore recommended, instead of vertical refuge which is another behavior of refuge to upper stories of the same building. However, in response to the above, there have been also a lot of opposing opinions stating that it would be difficult to seek safety without taking the vertical refuge.

For instance, in March, 2013, the Japanese Ministry of Land, Infrastructure, Transport and Tourism revised "Guideline for flood hazard mapping", and in a 2013 revision of the Guideline, the inundation depth ranks are shown in a simplified form such that the number of inundation depth ranks is reduced from five as having been established in conventional hazard maps in accordance with a rough estimate of inundation to three, that is, an inundation depth of at least 3.0 m (e.g., inundation above a second floor), that of 0.5 to less than 3.0 m (e.g., inundation above a first floor) and that of less than 0.5 m (e.g., inundation below the first floor). This revision of the Guideline also contains advices stating that "Take refuge to a second story or above of one's own house without overdoing it when refuge is late" to the local residents in an area which is expected to be inundated up to 0.5 to 3.0 m.

The present invention is to enable the vertical refuge, and a basic idea of the present invention is that the flood barrier which is at least as tall as 3 to 6 m, for instance, is constructed in the periphery of the building at first. Namely, while it is said that a conventional crime-prevention wall is often made to be as tall as 1.5 to about 1.8 m in consideration of natural lighting and/or visibility from the inside of the wall, an appearance from the outside thereof and a construction cost, the present invention is such that the openings in the flood barrier are sealed via the opening sealing means when floods arise, thereby forming the space isolated between the periphery of the building and the flood barrier, so that the inside of the flood barrier is allowed to be inundated at most up to a water level as equal as or smaller than the amount of rainfalls even when the outer area of the flood barrier is inundated up to a water level as equal as the estimated inundation depth, thereby resulting in no risk of inundation into the building through its entrance and/or windows. The present invention is also such that even when applied to an existing building, the opening sections of the building itself can cope with the floods in an unchanged condition without any need for repairing in particular, so that damages to the building can be eliminated or kept to a minimum.

It would be thus appreciated that the inside of the flood barrier can be kept to a tranquil state so that impact relating to functions of the building itself is small, even when the outer area of the flood barrier is inundated up to the water level as equal as or close to the estimated inundation depth such that it becomes hard for the residents to go into or out of the building, and besides, the safety of the building itself can be ensured even when the duration of inundation around the building is at least as long as one week, for instance.

Although no limitation is imposed on flood barrier materials in particular, use can be made of materials mainly containing watertight concrete having been used for construction of water tanks, pools and basements, for instance. Alternatively, the flood barrier may be formed of metal or reinforced plastic.

When precast products are installed in side-by-side arrangement to construct the flood barrier, the watertightness of the whole flood barrier shall be ensured in such a manner as to interpose a cutoff material between the precast products. Further, in order to resist the dynamic and static water pressures received when the floods arise, a buttress or a stay is additionally installed, as needed. It is to be noted that it is preferable to make underground embedment of a lower end of the flood barrier, as well as to take some measures for preventing generation of underground flows.

The flood barrier when being at least as tall as 3 to 6 m, for instance, is considered to involve such a problem that natural lighting and/or visibility from the inside of the flood barrier would be shielded by such flood barrier, in which case, however, the problems relating to the natural lighting and/or the visibility can be settled in a manner that a plurality of transparent windows ensuring watertightness are provided in the flood barrier. In this case, with a watertight window frame embedded or fitted into the flood barrier, a high-strength transparent window member such as polycarbonate and reinforced glass can be mounted to the window frame.

In regards to the appearance from both inside and outside of the flood barrier, various decorations are applied to the flood barrier surface, thereby providing the flood barrier which presents a better view in appearance as well. For instance, the flood barrier surface may be partly stone-pitched or pictorially patterned with tiles or formed in the shape of a greening wall to which plants can be planted.

As the opening sealing means, use can be made of a means composed of a support having a guide groove and arranged on both sides of the opening, a plurality of vertically-arranged cutoff panels constituted such that the opposite ends of each cutoff panel are fitted into the support guide grooves, and a cutoff material interposed between the guide groove and the cutoff panel and between the cutoff panels, for instance.

In this case, the cutoff panels are placed in a state of being stored in a storage space inside the building or its site at normal times, and installation of the cutoff panels to the support guide grooves takes place at emergency situations where flooding or storm surges are expected to arise. The weight of a single cutoff panel is preferably such that the single cutoff panel is allowed to be handled by manpower.

For the flood barrier when made to be at least as tall as 3 to 6 m, for instance, it is not easy to perform fitting of the cutoff panels from above into the support guide grooves, and hence, there may be provided a cutoff panel inserting portion in a lower portion of the support or a portion corresponding to an intermediate height position thereof to perform stacking of the cutoff panels while upwardly pushing up the upper cutoff panels in order. In this case, such measures as passing a wire through the cutoff panel may be also taken to push up the cutoff panel while pulling the wire through a pulley and/or a winch.

The cutoff material having elasticity is interposed between the upper and lower cutoff panels and between the cutoff panel and the support guide groove, followed by being subjected to pressing with a pressing means, as needed, to ensure the watertightness. Available pressing means include a mechanical pressing means and other pressing means utilizing pneumatic or fluid pressure.

Alternatively, the inundation preventing device disclosed in the patent document 3 or the waterproof shutter disclosed in the patent document 4 can be also utilized as the opening sealing means. It is to be noted that sealing of the openings with the opening sealing means may be performed in a horizontal direction without being limited to a vertical direction. For instance, use can be also made of an opening sealing means which is opened and closed in a horizontal direction in an accordion curtain-like fashion or a waterproof shutter which slides in a horizontal direction.

While the flood-resistant building equipped with the flood barrier according to the present invention is applicable to a new building as well, it is also understood that when applied to an existing building, renovation of the existing building into the flood-resistant building is executable without any need for large-scale repairing of the building itself in a manner that in the site of the existing building, the flood barrier is posteriorly constructed, together with the opening sealing means, in a predetermined spacing relationship to the building. In this case, a large number of existing buildings can be easily renovated into the flood-resistant buildings, and accordingly, such renovation is considered to be very effective as countermeasures against the floods.

A flood-resistant renovation method of a building according to the present invention is characterized in that in the periphery of an existing building such as a multiple dwelling housing, a hotel, an office building, a hospital and a factory, a flood barrier made to be watertight is constructed in a spacing relationship to the building and in a shape which encloses nearly the entire periphery of the building except openings serving as an entrance and exit at normal times, and an opening sealing means for sealing the openings of the flood barrier in a watertight manner during inundation is provided in the openings of the flood barrier, wherein a barrier to be constructed as the flood barrier is made to be at least as tall as an inundation depth estimated to occur in an applicable target area, as well as to have durability capable of resisting the water pressure at least corresponding to the estimated inundation depth.

In this case, a water receiving tank for supply of service water in case of disaster is installed underground or on the site or the rooftop of the building, so that the residents can receive the supply of water in the form of service water even during the refuge to last for at least one month, such as for ten days to one month, for instance, thereby enabling the long-term refuge.

In addition to the above, an emergency-use generator for use in disaster is installed on the rooftop of the building, thereby ensuring the supply of electricity during the refuge. Further, a septic tank for use in disaster is installed underground or on the site of the building, thereby enabling emergency sewage treatments inside the building even in a situation where its surrounding area is inundated. For installation of the septic tank, the backflows caused via the septic tank shall be prevented in such a manner as to provide a check valve on the side of drainage from the septic tank.

Effects of the Invention

It would be appreciated that the openings of the flood barrier are sealed via the opening sealing means when the floods arise, thereby forming the space isolated between the periphery of the building and the flood barrier, so that the inside of the flood barrier is allowed to be inundated at most up to the water level as equal as or smaller than the amount of rainfalls even when the outer area of the flood barrier is inundated up to the water level as equal as the estimated inundation depth, thus resulting in no risk of inundation into the building through its entrance and/or windows. Further, even when the present invention is applied to the existing building, the opening sections of the building itself can also cope with the floods in an unchanged condition without any need for repairing in particular, so that the damages to the building can be eliminated or kept to a minimum.

It would be also appreciated that the inside of the flood barrier can be kept in the tranquil state so that the impact relating to the functions of the building itself is small even when the outer area of the flood barrier is inundated up to the water level as equal as or close to the estimated inundation depth such that it becomes hard for the residents to go into or out of the building, and besides, the safety of the building itself can be ensured even when the duration of inundation is at least as long as one week, for instance, thereby enabling the safe and long-term refuge even during the floods in a manner that the emergency-use equipment such as the emergency-use generator, the emergency-use water receiving tank and the emergency-use septic tank is installed beforehand inside the flood barrier, for instance.

It would be also appreciated that the flood-resistant building which is of a type serving as a facility for public use can be utilized also as a place of refuge to accept the neighbors that are difficult to take refuge from a transregional standpoint.

It would be also appreciated that in regards to the flood barrier, the large-sized window having watertightness enough to be capable of resisting the water pressure is provided in the flood barrier, and/or various decorations are applied thereto, thereby ensuring the visibility from the inside of the flood barrier such as to make the residents on the first and second floors of the building free from feeling blocked psychologically. In this case, the flood barrier can be also considered to present a better view in appearance so as to raise a value of property of the building from the viewpoint of its designs without impairing the appearance from both inside and outside of the flood barrier.

It would be also appreciated that the emergency-use equipment such as the emergency-use water receiving tank, the emergency-use generator and the emergency-use septic tank which are for use in disaster is installed underground or on the site or the rooftop of the building, so that the infrastructure inside the building can be ensured, thereby enabling the long-term refuge even in a situation where the supply of essential services from the outside is stopped.

EMBODIMENTS OF THE INVENTION

Hereinafter will be described the present invention with reference to the attached drawings.

Figure 1:
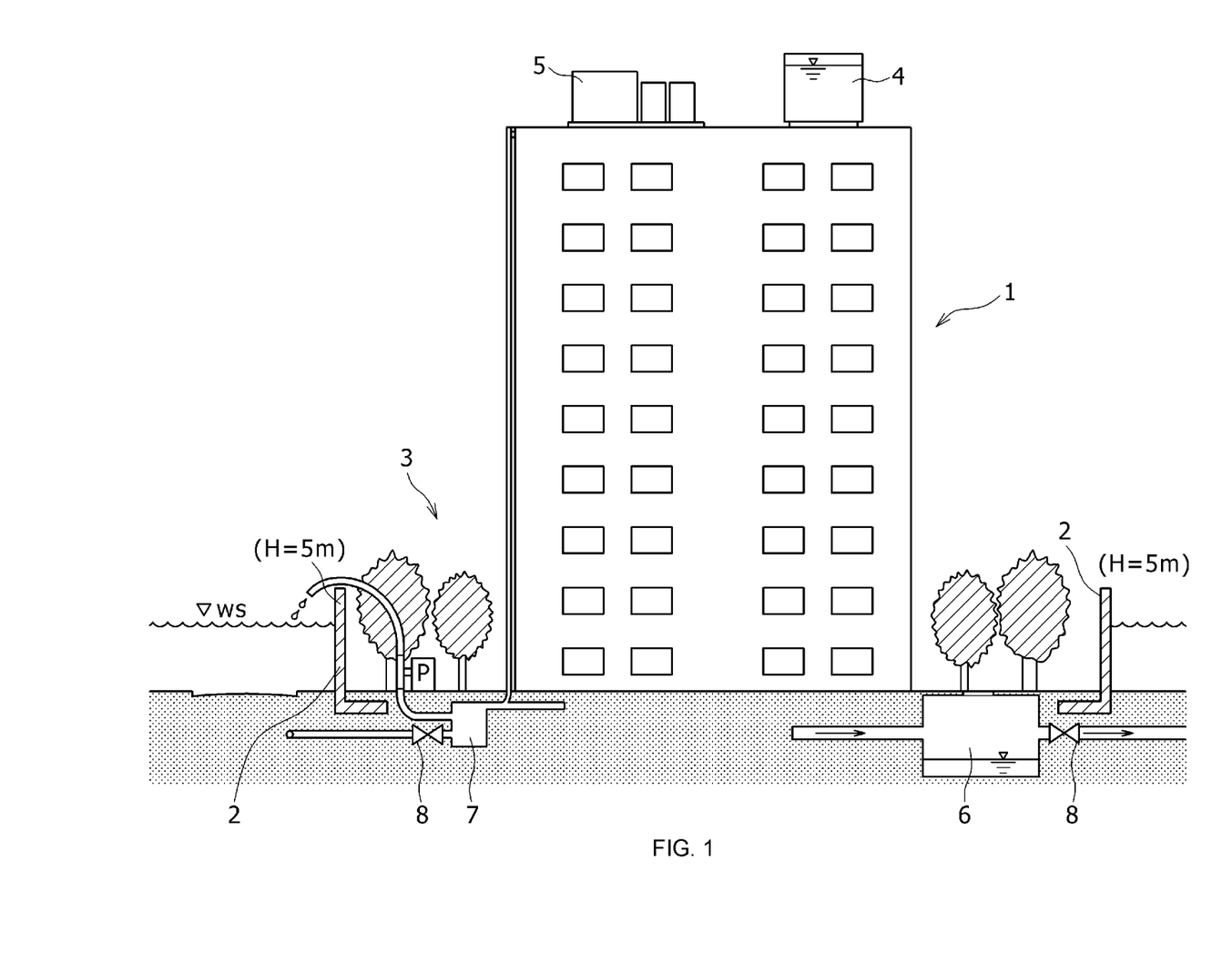
FIG. 1 is a vertical sectional view conceptually showing one embodiment of a flood-resistant building equipped with a flood barrier according to the present invention.

FIG. 1 conceptually shows one embodiment of a flood-resistant building equipped with a flood barrier according to the present invention. It is to be noted that while the present invention is applicable to an existing building as well as to a new building, the embodiment shown in FIG. 1 relates to a flood-resistant renovation method in cases where in a site surrounding a building 1, a flood barrier 2 is posteriorly constructed in a shape which encloses nearly the entire periphery of the building 1, on the assumption that the building 1 is of the type of existing multiple dwelling housing.

Structurally, in the site surrounding the building 1, the flood barrier 2 is constructed in a shape which encloses nearly the entire periphery of the building 1, and an opening sealing means (see FIG. 4 described later, for instance) is provided in sections (not shown) serving as an entrance and exit at normal times such as those connected to an entrance hall, to a parking place and to a place where residential wastes and others are to be carried out, the opening sealing means being for sealing the openings of these sections in a watertight manner, wherein the openings are sealed via the opening sealing means when the risk of inundation due to flooding or storm surges arises, thereby forming a tranquil space 3 isolated inside the flood barrier 2.

The flood barrier 2 is made to be at least as tall as an inundation depth estimated to occur in an area where the building 1 is located, and hence, the flood barrier height can be arbitrarily set to be at least as equal as the estimated inundation depth in consideration of the securement of safety in case of unexpected problems, such as at least 2 to about 3 m when the estimated inundation depth is 2 m, at least 4 to about 5 m when the estimated inundation depth is 4 m and at least 5 to about 6 m when the estimated inundation depth is 5 m, for instance.

The flood barrier 2 shall be watertight and is thus formed by arranging L-shaped blocks of watertight concrete side by side, followed by interposing a cutoff material such as packing between the L-shaped blocks, for instance. Alternatively, the flood barrier 2 may be formed of cast-in place concrete as well.

As a matter of course, the flood barrier 2 shall have a structure and durability which are capable of adequately resisting the static and dynamic water pressures received when flooding or storm surges arise, and hence, a buttress and/or a stay is additionally installed, as needed.

Further, the flood barrier 2 also shall have a structure which is capable of coping with underground flows, backflows in sewage pipes and like problems which would be caused when inundation with a great depth occurs. Specifically, in order to cope with such problems, a depth of embedment of the flood barrier 2 is increased and/or the soil improvement of a foundation part of the flood barrier 2 is performed, as needed. Meanwhile, to a pipeline leading to the outside, a check valve 8 is provided.

While the present invention is to enable safe vertical refuge without difficulties, there exists the need to cope with even a situation where the duration of inundation in the area around the building is at least as long as one week, for instance, because of the fact that the residents would be basically inhibited from going into or out of the building overland when the area around the building is inundated up to a great depth.

Accordingly, in this embodiment, an emergency-use water receiving tank 4 is installed, together with an emergency-use generator 5, on the rooftop of the building 1 separately from a normal-use water receiving tank, and besides, an emergency-use septic tank 6 is installed underground on the site, thereby providing a constitution which can ensure the living environment of the long-term refuge which may last for at least one week to about one month, for instance. Further, for the occasions when having significantly high precipitation caused by heavy rainfall, a rainwater storage tank 7 installed underground on the site of the building is applied to suppress water-level elevation due to rainfall inside the flood barrier 2. In this case, rainwater fallen on a place enclosed with the flood barrier 2 can be once stored in the rainwater storage tank 7 and then drained through an upper part of the flood barrier 2 with a draining pump, as needed.

Figure 2:
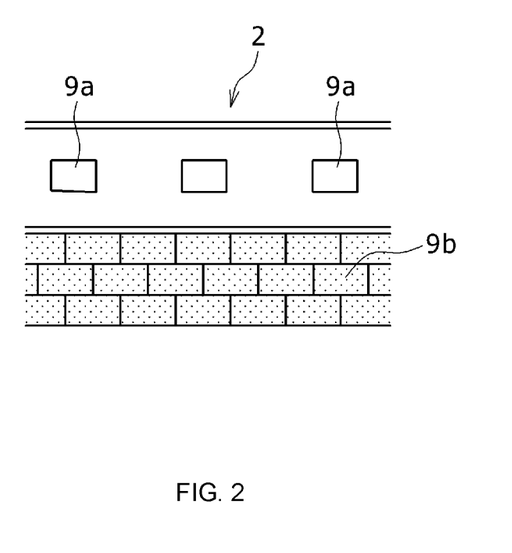
FIG. 2 is an elevational view showing one embodiment of installation of windows to the flood barrier, as well as decorations of the flood barrier for enhancement on the appearance.

The embodiment of the present invention is also such that the periphery of the building is enclosed with the tall flood barrier 2, and hence, it may be considered that there is such problems that the flood barrier 2 would be a hindrance to natural lighting such as sunlight to thereby cause generation of a shadow and/or would make some residents on the first and second floors of the building 1 feel blocked psychologically, in which case, however, the problems relating to the natural lighting and/or the blocked feeling of the residents can be alleviated in a manner that a large-sized transparent window 9a is provided in the flood barrier 2 as shown in FIG. 2.

In regards to the window 9a, use can be made of a polycarbonate window material and the like, for instance, from the viewpoints of strength and durability. Further, in order to prevent damages in a flood barrier portion to which the window 9a is installed, the window material may be mounted after a high-strength window frame such as a steel window frame is incorporated in such flood barrier portion.

Moreover, various decorations can be applied to the flood barrier 2 in consideration of the outer appearance, thereby providing the flood barrier also serving as a regionally symbolized spot-like structure so as to raise a value of property of the building 1. FIG. 2 shows stone-pitched patterns 9b as one decoration applied to the flood barrier 2, or alternatively, another decoration by pictorial patterns will do as well.

Figure 3:
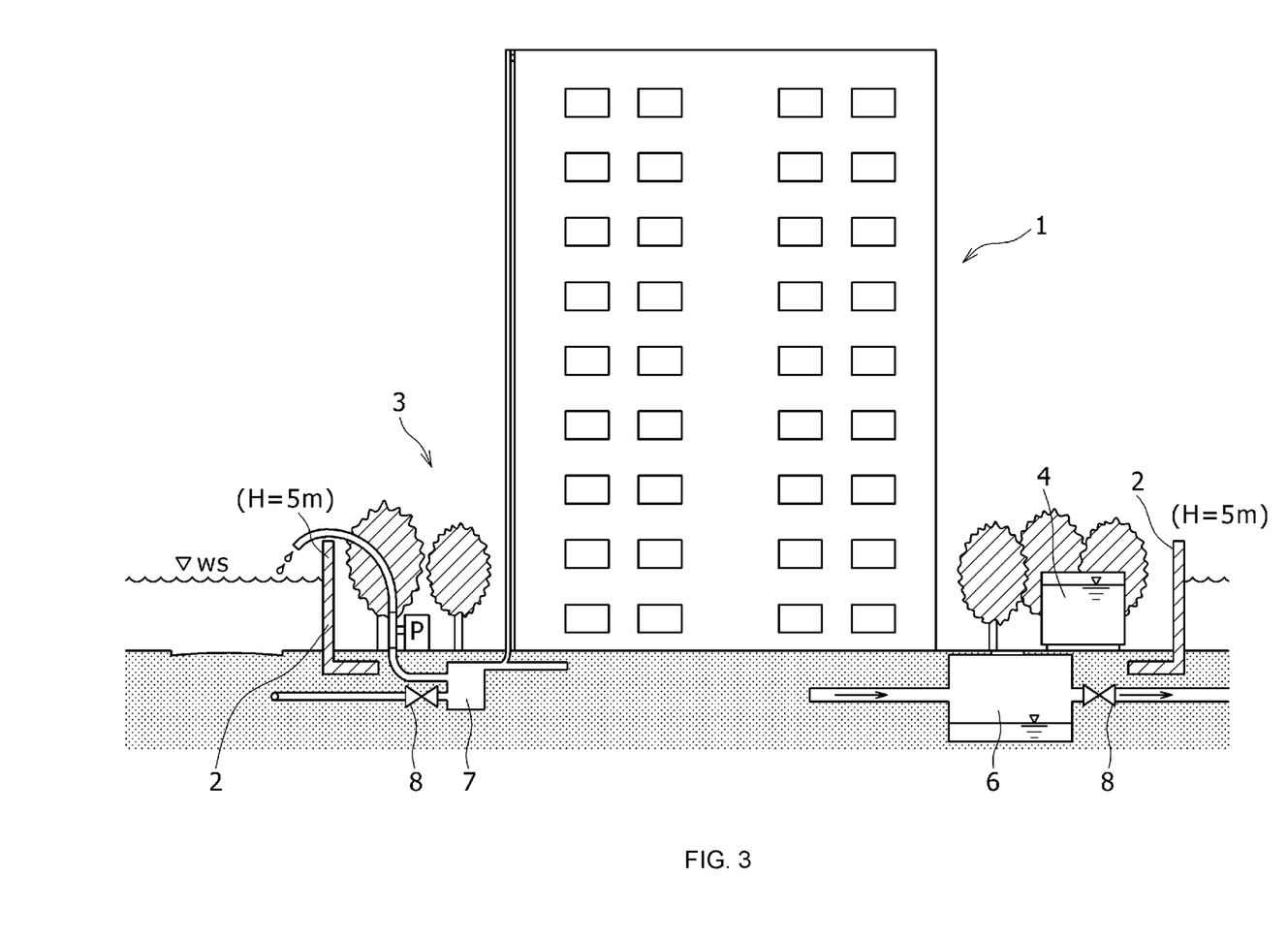
FIG. 3 is a vertical sectional view conceptually showing another embodiment of the flood-resistant building equipped with the flood barrier according to the present invention.

FIG. 3 conceptually shows another embodiment of the flood-resistant building equipped with the flood barrier according to the present invention. The embodiment shown in FIG. 3 is similar to the embodiment shown in FIG. 1 in a positional relationship between the building land the flood barrier 2 which encloses the periphery of the building 1 and also in a structure in which the openings of the flood barrier 2 are sealed via the opening sealing means, thereby forming the tranquil space 3 isolated inside the flood barrier 2 when the risk of inundation due to flooding or storm surges arises.

Conventionally, the hospitals or like buildings have been equipped with an emergency-use power supply to prepare for long-term blackouts, or in some cases, there has been also provided the equipment supposed to be used for vertical refuge when the floods arise, in which case, however, it is to be understood that inundation into the building 1 has been prevented merely in such a manner that a doorway to the building 1 is closed, and hence, various troubles and/or damages would be expected to be caused under the circumstances that the inundation depth reaches the second floor of the building.

Meanwhile, the present invention is to allow the tranquil space 3 isolated to be formed inside the flood barrier 2 even when the risk of inundation due to flooding or storm surges arises, so that damages to the building 1 itself can be kept to a minimum.

The embodiment shown in FIG. 3 is such that the emergency-use water receiving tank 4 is installed on the ground in the site of the building, while the emergency-use septic tank 6 and the rainwater storage tank 7 which is to cope with heavy rainfall are installed underground, when restriction is imposed on utilization of the rooftop of the building due to the existence of a heliport or the like on the rooftop, for instance, on the premise that the equipment such as the emergency-use power supply has been installed beforehand.

As a matter of course, an opening is to be provided in the section serving as the entrance and exit at normal times such as those connected to the entrance hall, to the parking place and to the place where the residential wastes and others are to be carried out, and hence, the openings of these sections are sealed when the risk of inundation due to flooding or storm surges arises, thereby forming the space 3 isolated inside the flood barrier 2.

Figure 4:
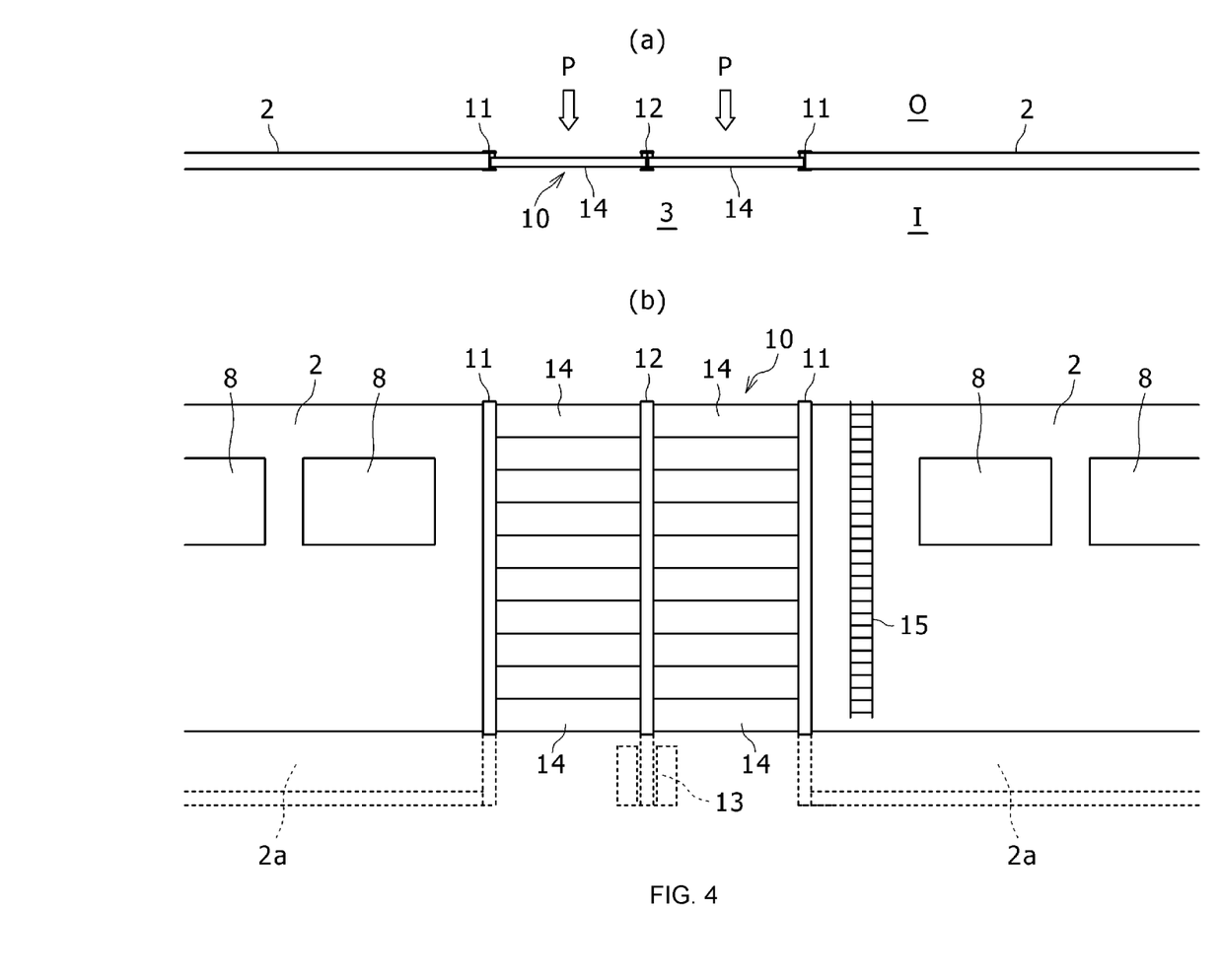
FIG. 4 is an elevational view showing one instance of an opening sealing means when viewing from the inside of the flood barrier.

FIG. 4 shows one instance of the opening sealing means for sealing the openings 3 of these sections.

The opening sealing means according to one instance shown in FIG. 4 is composed of a support 11 arranged beforehand on both sides of the opening 3, an additional support 12 constituted such that a lower end thereof is inserted into and fixed to a support receiver 13 arranged in the center of the opening 3 at emergency situations and a plurality of vertically-arranged cutoff panels 14 respectively fitted into guide grooves which are provided vertically in the supports 11 on both sides of the opening and in the additional support 12 in the center thereof.

A cutoff material such as packing is interposed between the guide groove of each of the support 11 and the additional support 12 and the cutoff panels 14 and between the cutoff panels 14 to ensure the watertightness during the time that the opening is in a sealed state.

The additional support 12 and the cutoff panels 14 are placed in the state of being stored in a storage space in the building or its site at normal times, and installation of the additional support and the cutoff panels after removal from the storage space takes place at emergency situations where flooding or storm surges are expected to arise. The weight of the additional support 12 and that of the single cutoff panel 14 are preferably such that the additional support and the single cutoff panel are each allowed to be handled by manpower.

Referring to FIG. 4, reference numeral 2a designates an embedded portion of the flood barrier 2, and reference numeral 15 is an emergency-use ladder installed on an inside surface of the flood barrier 2. Alternatively, there may be provided steps, instead of the ladder 15, to allow for climbing-over of the flood barrier 2.

Alternatively, a reinforcing rib may be also installed to the cutoff panel 14, when a panel strength of the cutoff panel 14 is insufficient.

Figure 5:
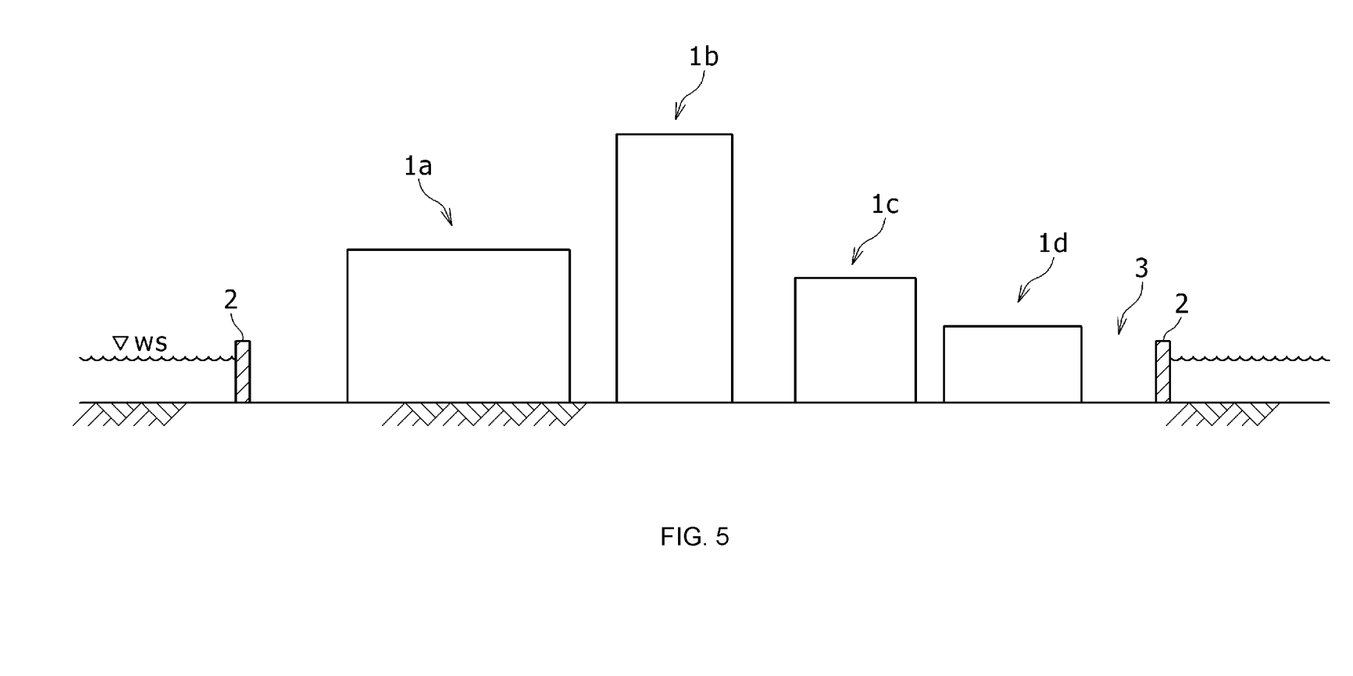
FIG. 5 is a vertical sectional view showing one embodiment of the flood barrier when constructed in a shape which encloses the periphery of a plurality of buildings.

FIG. 5 shows one embodiment of the flood barrier 2 when constructed in a shape which encloses the periphery of a plurality of buildings 1a to 1d, as a different embodiment of the present invention.

The embodiment shown in FIG. 5 is such that in the periphery of a group of the buildings including a multiple dwelling housing 1a, an office building 1b, a hospital 1c and a storehouse 1d which are all constructed within a predetermined area, the flood barrier 2 is constructed in a shape which encloses the entire periphery of the group of the buildings, the flood barrier being made to be watertight, as well as to be at least as tall as the inundation depth estimated to occur in case of the floods in an area where such group of the buildings is located, and the openings of the flood barrier 2 are sealed via the opening sealing means when the floods arise, thereby forming the tranquil space 3 isolated between the periphery of the group of the buildings and the flood barrier 2 to prevent damages to the buildings.

Although being similar to the embodiments shown in FIGS. 1 to 3 in a basic concept as an invention, it is to be understood that the embodiment shown in FIG. 5 offers the advantage of enabling mutual compensation of refuge life-concerned functions in the area enclosed with the flood barrier 2 in a manner that a plurality of kinds of buildings different in functions are protected at the same time.

Referring to FIG. 5, there is shown one combination of the buildings including the multiple dwelling housing 1a, the office building 1b, the hospital 1c and the storehouse 1d, or alternatively, other combinations with various kinds of buildings such as a city hall, a hotel, a factory and a shopping mall will do as well.

While the embodiment shown in FIG. 5 is applicable also to construction of the flood barrier 2 in the periphery of the group of the existing buildings, it can be also considered that this embodiment is suitably applied to planning to newly construct building groups for redevelopments at the regional level.

Figure 6:
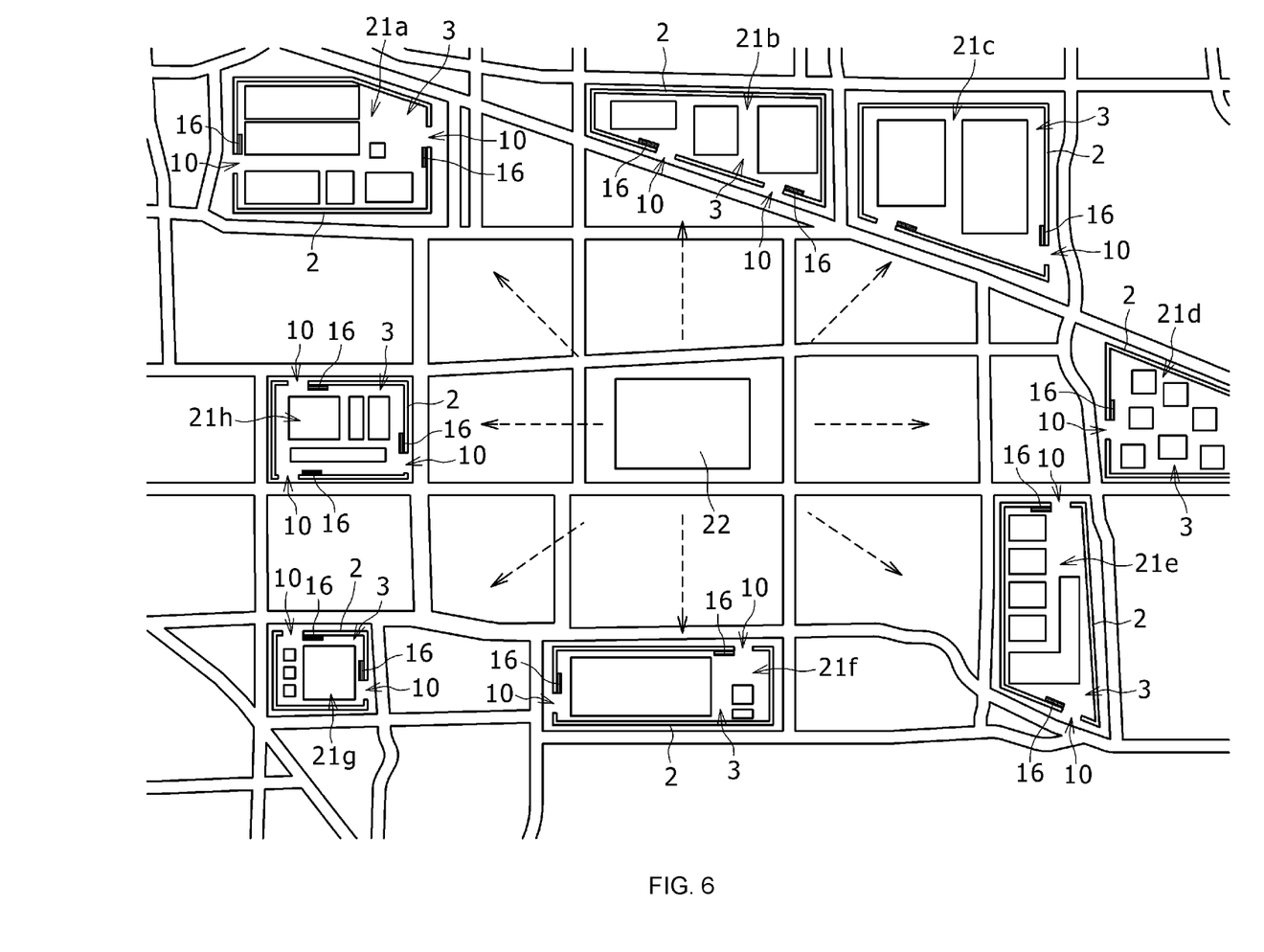
FIG. 6 is a plan view showing one embodiment of the flood-resistant building equipped with the flood barrier according to the present invention when constructed in multiple locations for every section of a city area.

FIG. 6 shows one embodiment of the flood-resistant building equipped with the flood barrier 2 according to the present invention when constructed in multiple locations for every section of a city area, as a further different embodiment of the present invention.

Specifically, the embodiment shown in FIG. 6 is such that in the site of each of factories 21a to 21h located in an industrial area where these factories 21a to 21h are densely distributed, the flood barrier 2 is constructed in a shape which encloses each of the factories 21a to 21h, and an opening 10 is provided in a section serving as a passageway to the inside of the factory site, wherein an openable cutoff door 16 is installed to this opening.

The opening 10 of the flood barrier 2 is sealed via the cutoff door 16 serving as the opening sealing means when the floods arise, thereby forming the space 3 isolated between the periphery of the factory building and the flood barrier 2 to prevent damages to the building.

It is to be noted that the embodiment shown in FIG. 6 is for the group of the existing factories located in an industrial area and is based on the assumption that as shown in the center of FIG. 6, a precast concrete product manufacturing factory 22 is built prior to construction of the flood barrier 2, and under such a situation, the flood barrier 2 is constructed by making use of precast concrete panels or blocks manufactured in the precast concrete product manufacturing factory 22.

EXPLANATION OF REFERENCE NUMERALS

1 . . . Building, 1a . . . Multiple dwelling housing, 1b . . . Office building, 1c . . . Hospital, 1d . . . Storehouse, 2 . . . Flood barrier, 2a . . . Embedded portion, 3 . . . Space, 4 . . . Water receiving tank, 5 . . . Emergency-use generator, 6 . . . Septic tank, 8 . . . Check valve, 9a . . . Window, 9b . . . Decoration, 10 . . . Opening, 11 . . . Support, 12 . . . Additional support, 13 . . . Support receiver, 14 . . . Cutoff panel, 15 . . . Ladder, 16 . . . Cutoff door, 21a . . . Factory, 21b . . . Factory, 21c . . . Factory, 21d . . . Factory, 21e . . . Factory, 21f . . . Factory, 21g . . . Factory, 21h . . . Factory, 22 . . . Precast concrete product manufacturing factory

What is claimed is:

1. A flood-resistant renovation method for an existing building, wherein said existing building is one of a multiple dwelling housing, a hotel, an office building, a hospital or a factory, wherein the method comprises:
   constructing a water tight flood barrier;
   arranging said water tight flood barrier around said existing building such that the flood barrier encloses substantially an entire periphery of said existing building;
   forming an opening in said water tight flood barrier to define an entrance and exit; and
   arranging an opening sealing means for sealing the opening in a watertight manner; said opening sealing means comprising:
      a support arranged between a first side and a second side of the opening,
      a plurality of first panels arranged vertically between the support and the first side of the opening, and
      a plurality of second panels arranged vertically between the support and the second side of the opening.

2. A flood-resistant building, wherein said building is one of a multiple dwelling housing, a hotel, an office building, a hospital or a factory, said building comprising:
   a flood barrier, wherein said flood barrier is configured to be watertight and is arranged around said building,
   said flood barrier being shaped and dimensioned to enclose substantially an entire periphery of said building,
   wherein said flood barrier defines an opening serving as an entrance and exit, and said flood barrier further comprising an opening sealing means for sealing said opening of said flood barrier in a watertight manner,
   said opening sealing means comprising:
      a first support arranged between a first side and a second side of the opening;
      a plurality of first panels arranged vertically between the first support and the first side of the opening, and
      a plurality of second panels arranged vertically between the first support and the second side of the opening.

3. The flood-resistant building according to claim 2, wherein said flood barrier is formed of waterproof concrete.

4. The flood-resistant building according to claim 2, wherein said flood barrier has a plurality of windows which are made to be watertight.

5. The flood-resistant building according to claim 2, wherein decorative designs are applied to a surface of said flood barrier.

6. The flood-resistant building according to claim 2, wherein said opening sealing means further comprises second and third supports extending vertically and respectively arranged at the first and second sides of said opening, wherein each of said first, second, and third supports includes a guide groove, and wherein each panel includes opposing ends respectively inserted in the guide grooves of the respective first, second, and third supports, and wherein cutoff materials are respectively interposed between the opposing ends of the panels and the guide grooves.

7. The flood-resistant building according to claim 2, wherein said opening sealing means is a cutoff shutter configured to slide in a horizontal or vertical direction to seal said openings.

8. The flood-resistant building according to claim 2, wherein said building is an existing building, and said flood barrier is constructed posteriorly around said existing building.

* * * * *

UNITED STATES PATENT AND TRADEMARK OFFICE
CERTIFICATE OF CORRECTION

| | |
|---|---|
| PATENT NO. | : 11,613,901 B2 |
| APPLICATION NO. | : 17/277547 |
| DATED | : March 28, 2023 |
| INVENTOR(S) | : Masamichi Kamei |

It is certified that error appears in the above-identified patent and that said Letters Patent is hereby corrected as shown below:

On the Title Page (30) Foreign Application Priority Data:
"JP2018-195613" should be --JP2018-198613--

Signed and Sealed this
Thirtieth Day of January, 2024

Katherine Kelly Vidal
*Director of the United States Patent and Trademark Office*